Dec. 21, 1965  G. BAAS ETAL  3,225,132
DEVITRIFIED GLASS-TO-METAL COMPRESSION SEAL
Filed April 12, 1961

INVENTOR
GERARDUS BAAS
COENRAAD M. LA GROUW
BY
AGENT

United States Patent Office 3,225,132
Patented Dec. 21, 1965

3,225,132
DEVITRIFIED GLASS-TO-METAL COMPRESSION SEAL
Gerardus Baas and Coenraad Maria La Grouw, Eindhoven, Netherlands, assignors to North American Philips Company, Inc., New York, N.Y., a corporation of Delaware
Filed Apr. 12, 1961, Ser. No. 102,579
Claims priority, application Netherlands, Apr. 14, 1960, 256,600
1 Claim. (Cl. 174—151)

Our invention relates to a leading-in member comprising a metal ring which encloses at least one metal conductor, in which the space between the ring and the conductor contains an insulating material under compression, i.e., the coefficient of expansion of the insulating material is smaller than that of the metal of the ring.

In known leading-in members of this type, the insulating material is glass. Due to the above choice of the coefficient of expansion, this glass is under pressure, as a result of which a proper mechanical strength of the leading-in member is obtained. In these leading-in members, the coefficient of expansion of the metal conductor, in most of the cases, substantially equals the coefficient of expansion of the glass.

The principal object of our invention is to provide an increase in the mechanical strength of the leading-in member.

Another object of our invention is to provide a leading-in member having greater impact resistance.

These and further objects of our invention will appear as the specification progresses.

According to the invention, we employ as an insulating material in a leading-in member of the type described a devitrified glass mass, i.e. a glass which has been, in part at least, converted or devitrified to a crystalline phase.

Devitrified glass can be obtained in various ways. For example, powdered glass can be sintered so that crystallization occurs at the surface. Alternatively, as a starting material powdered glass may be chosen to which a certain quantity of nucleating agents such as $Li_2CO_3$, MgO, $LiAl(SiO_4)$, which initiate the crystallization is added, or by a combination of both methods.

The resulting strength of the leading-in member is probably not only due to the better mechanical properties of the member or to the devitrified glass, but should probably be due to the cooperation of the crystalline structure and the pressure to which the insulating material is subjected which results in a better resistance against mechanical forces.

In another embodiment of the invention an even larger mechanical strength is obtained, if the surface of the insulating material between the ring and the conductor has a convex shape at least one side.

The invention will now be described in greater detail with reference to the accompanying drawing in which.

Figure 1:
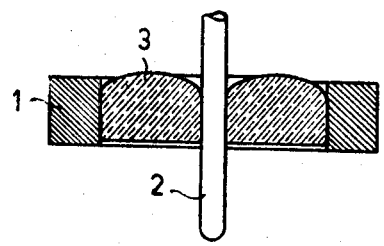
FIG. 1 shows one embodiment of a leading-in member according to the invention.
Figure 3:
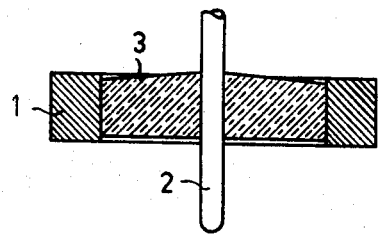
FIG. 3 shows another embodiment of a leading-in member according to the invention.

In the leading-in members as shown in FIGS. 1 and 3, 1 is the metal ring, 2 the metal conductor, and 3 the member of insulating material. As is usual in leading-in members of this type, the coefficient of linear expansion of the member 3 is adapted substantially to that of the metal conductor 2, while the coefficient of linear expansion of the metal of the ring 1 is approximately $25 \times 10^{-7}$ per ° C. larger than that of the insulating member 3. In the present examples, the ring 1 is manufactured from steel with a coefficient of expansion of $120 \times 10^{-7}$ per ° C. between 30° and 300° C. and the conductor 2 consists of nickel-iron of a coefficient of expansion of $95 \times 10^{-7}$ per ° C. between 30° and 300° C. In addition, as is also known, the ring 1 has a thickness such that the member 3 is kept under pressure.

As a glass which may serve as starting material for the manufacture of the member 3, since it can be caused to crystallize with one of the methods already mentioned, within a time acceptable for mass production and the coefficient of expansion of which is approximately $90 \times 10^{-7}$ per ° C. between 30 and 300° C., while the processing temperature in addition is sufficiently lower than the melting temperature of those metals, the composition in percent by weight is given by way of example: $SiO_2$, 11.6; $B_2O_3$, 14.9; MgO, 9.1; BaO, 48.0; $Al_2O_3$, 8.2; and ZnO, 8.2.

Figure 2:
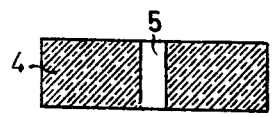
FIG. 2 shows a body of sintered, and at least partially crystallized, powdered glass for use in a leading-in member according to the invention.

A glass of such a composition is fritted and ground to a glass powder, the average grain size of which is of the order of magnitude of 10 microns, while the largest grains are smaller than approximately 100 microns. This powder, mixed with a binder, if desired, is compacted into a piece of glass 4 having the shape as shown in FIG. 2, the outside diameter of which exactly fits, throughout its height, within the ring 1. The compacted member further is provided with a bore 5 through which conductor 2 can just pass through after the sintering treatment to be described below. The thus compacted member, as shown in FIG. 2, is then sintered at a temperature at which crystallization hardly, or does not, occur. Then, the sintered member 4, the metal ring 1 and the metal conductor 2 are combined to form an assembly as shown in FIGS. 1 or 3. If a leading-in member is desired which is flat on one side, the assembly is placed on a flat base which naturally is provided with a bore for passing the conductor 2, and for which separate supporting means may be used. If the lower side of the member 3 is to have a convex shape, the shape of the base is naturally adapted to this shape.

The resulting assembly is then heated until the desired degree of crystallization is obtained. It is noted that in the manufacture of the leading-in member, it is convenient, but not necessary first to form a separate sintered body. It is also possible to place the ground glass powder immediately in the space between the ring 1 and the conductor 2. The phenomena occurring in the thermal treatment will be explained with reference to FIG. 4.

Figure 4:
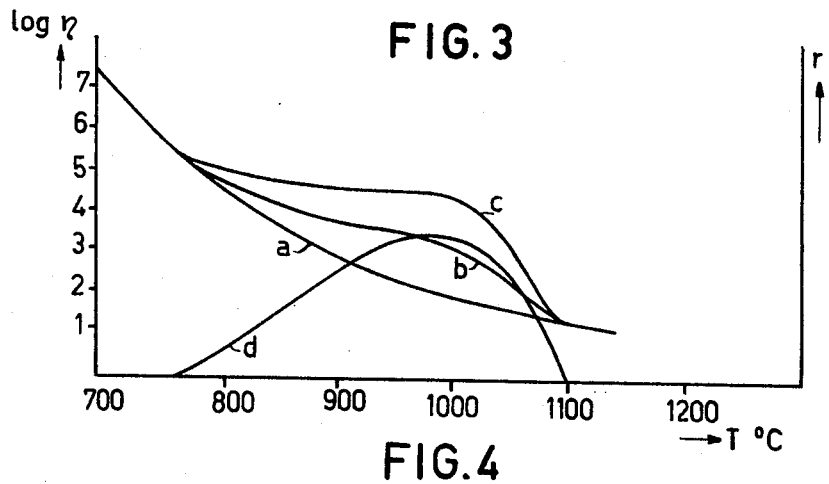
FIG. 4 is a graph showing the viscosity and the degree of crystallization as a function of temperature.

Along the horizontal axis of FIG. 4, the temperature is plotted in ° C.; along the vertical axis on the left hand side the logarithm of the viscosity $\eta$ is plotted; and along the vertical axis on the right hand side the crystallization degree $\gamma$ is plotted. The curves $a$, $b$ and $c$ relate to the viscosity, the curve $d$ to the degree of crystallization.

The temperature range of approximately 750° C. to the liquidus temperature of 1100° C. is the range in which crystallization can occur, the degree of crystallization being the result of the cooperation of the rate of the formation of nucleating agents and the rate of crystal growth. Thus, to obtain the desired leading-in members, the assembly should be subjected to a suitable temperature treatment.

If the heating is very rapid, the viscosity will vary according to curve $a$ and no crystallization will occur. If heating is effected more slowly, the degree of crystallization will noticeably influence the viscosity of the glass mass during the increase of the temperature, so that the viscosity will vary according to curve $b$ or curve $c$.

Due to the position of the crystallization range with respect to the viscosity curve and under the influence of the surface energy of the glass mass, different shapes of the leading-in member may be formed. With a temperature treatment associated with a variation of the viscosity according to curve $b$, the flat sealing as shown in FIG. 3 will be the result. If heating is carried out at temperatures higher than approximately 1050° C., no crystallization will occur.

If the temperature treatment is chosen so that the viscosity varies approximately according to curve $c$, the shape as shown in FIG. 1 will be the result if heating is not carried on at temperatures higher than approximately 1050° C. This turns out to be the case if in the temperature range of approximately 750° C. to approximately 950° C. the rate of heating was less than 50° C. per minute.

If this range of heating was exceeded, a leading-in member of the shape as shown in FIG. 3 was the result.

From falling-ball experiments, it appeared that the leading-in member of the shape as shown in FIG. 1 is considerably stronger than that shown in FIG. 3. In such experiments, the metal ring 1 only was supported. In the case of the construction as shown in FIG. 1, no damage occurred when a steel ball of 2.5 cm. diameter was dropped, on the convex side of the member, on to the conductor 2 from a height of 100 cm. In the construction as shown in FIG. 3, it appeared that cracks occurred in the insulating member if a height of fall of 50 cm. was surpassed. For the sake of comparison, it is noted that, in a non-crystallized glass under the same compressive stresses, cracks will occur already at a far smaller height of fall of, for example, approximately 20 cm.

While we have thus described our invention in connection with specific embodiments, other modifications will be apparent to those skilled in this art without departing from the spirit and scope of the invention as defined in the appended claim.

What we claim is:

A devitrified glass-to-metal compression seal comprising a metal conductor, a metal ring surrounding and spaced from said conductor, and an insulating material under compressive stress in the space between the conductor and the ring, said insulating material being composed of a devitrified glass having a composition in percent by weight of about 11.6% of $SiO_2$, 14.9% of $B_2O_3$, 9.1% of $MgO$, 48% of $BaO$, 8.2% of $Al_2O_3$ and 8.2% of $ZnO$, and having a temperature coefficient of expansion less than that of the ring.

References Cited by the Examiner

UNITED STATES PATENTS

| | | | |
|---|---|---|---|
| 1,814,012 | 7/1931 | Taft | 49—77 |
| 2,113,818 | 4/1938 | Sullivan | 49—77 |
| 2,318,435 | 5/1943 | Stupakoff et al. | 174—152.4 |
| 2,458,748 | 1/1949 | Stupakoff | 174—152.4 |
| 2,770,923 | 11/1956 | Dalton et al. | 189—36.5 |
| 2,784,532 | 3/1957 | Griffiths | 49—81 |
| 2,876,120 | 3/1959 | Machlan | 49—88 |
| 2,889,952 | 6/1959 | Claypoole | 65—33 |
| 2,920,971 | 1/1960 | Stookey | 49—77 |
| 2,949,376 | 8/1960 | Comer | 29—92.5 X |
| 2,949,702 | 8/1960 | Blanding et al. | 49—81 |
| 2,951,167 | 8/1960 | Kegg et al. | 106—39 |
| 3,006,984 | 10/1961 | Bol et al. | 174—151 |

FOREIGN PATENTS 551,562  1/1958  Canada.

OTHER REFERENCES

Phase Diagrams for Ceramists, by Levin, McMurdie and Hall, published by The American Ceramic Society, Inc., Columbus, Ohio, 1956, pp. 14–31.

Hand Book of Glass Manufacture, vol. II, by Fay V. Tooley, published by Ogden Publishing Co., New York 36, N.Y., 1960, pp. 187–199.

ALEXANDER WYMAN, *Primary Examiner.*

R. V. ROLINEC, EARL M. BERGERT, *Examiners.*